(12) United States Patent
Chou

(10) Patent No.: US 10,488,956 B2
(45) Date of Patent: Nov. 26, 2019

(54) LUMINOUS MOUSE PAD

(71) Applicant: Hades-Gaming Corporation, New Taipei (TW)

(72) Inventor: Hung-Jen Chou, New Taipei (TW)

(73) Assignee: HADES-GAMING CORPORATION, New Taipei (TW)

(*) Notice: Subject to any disclaimer, the term of this patent is extended or adjusted under 35 U.S.C. 154(b) by 0 days.

(21) Appl. No.: 16/151,600

(22) Filed: Oct. 4, 2018

(65) Prior Publication Data
US 2019/0302906 A1    Oct. 3, 2019

(30) Foreign Application Priority Data
Mar. 28, 2018  (TW) .............................. 107204032 U

(51) Int. Cl.
*F21V 33/00* (2006.01)
*G06F 3/039* (2013.01)

(52) U.S. Cl.
CPC ............ *G06F 3/0395* (2013.01); *F21V 33/00* (2013.01)

(58) Field of Classification Search
None
See application file for complete search history.

(56) References Cited

U.S. PATENT DOCUMENTS

| 10,216,298 | B2* | 2/2019 | Chou | G06F 3/0395 |
| 2016/0124526 | A1* | 5/2016 | Chou | G06F 3/0395 |
| | | | | 362/311.02 |
| 2018/0239075 | A1* | 8/2018 | Chou | G02B 6/0023 |

* cited by examiner

*Primary Examiner* — Vip Patel
(74) *Attorney, Agent, or Firm* — Chun-Ming Shih; HDLS IPR Services

(57) ABSTRACT

A luminous mouse pad includes a pad assembly, a cap member and a light emitting unit. The pad assembly includes a base plate, a pad, and an anti-slip plate. The base plate has a main board and an extension plate extending from the main board; the pad is stacked onto the main board; the light guide plate is sandwiched between the main board and the pad; the anti-slip plate covers the main board; the cap member is coupled to the base plate and totally covers the extension plate, and a cavity is formed between the cap member, extension plate and light guide plate; and the light emitting unit is contained in the cavity and corresponsive to the light guide plate. The base plate and cap member may be manufactured by different simple-structured molds separately to save costs and improve the yield rate of the luminous mouse pad.

10 Claims, 6 Drawing Sheets

LUMINOUS MOUSE PAD

BACKGROUND OF THE INVENTION

Technical Field

This disclosure relates to a mouse pad structure, and more particularly to a luminous mouse pad.

Description of Related Art

To pursue a cool and dazzle look, a luminous mouse pad has been introduced in the market. A pad with a light guide plate has a light emitting unit such as a light emitting diode (LED) installed at a position corresponding to the light guide plate, and a light source is guided and outputted from the light guide plate to improve a user's visual feeling, and then a cover is covered onto the light emitting unit to prevent the light source of the light emitting unit from projecting onto the pad or affecting the normal use of the mouse.

However, both base and cover of the pad are integrally formed by mold casting, and the cover has an accommodating groove formed therein, so that the mold incurs a higher cost and the manufacturing process has a lower yield rate. In addition, the junction of the base and cover may be broken or cracked easily. Therefore, it is an important subject for mouse pad manufacturers to improve the structure of the conventional luminous mouse pad.

In view of the aforementioned drawbacks of the prior art, the discloser of this disclosure based on years of experience to conduct extensive research and experiment, and finally provided a feasible solution to overcome the drawbacks of the prior art.

SUMMARY OF THE INVENTION

Therefore, it is a primary objective of this disclosure to provide a luminous mouse pad comprising a base plate and cap member coupled to each other, so that the base plate and the cap member can be manufactured by two different simple-structured molds respectively. Compared with the conventional luminous mouse pad with both base plate and cap member manufactured by the same complicated-structured mold, the luminous mouse pad of this disclosure has the advantages of saving costs and improving the yield rate.

In an embodiment of this disclosure, the disclosure provides a luminous mouse pad comprising: a pad assembly, further comprising: a base plate, having a main board and an extension plate extending from a side of the main board; a pad, stacked onto the top of the main board; a light guide plate, sandwiched between the main board and the pad; and an anti-slip plate, covering the top of the main board; a cap member, coupled to the base plate and completely covering the extension plate, and a cavity being formed between the cap member, the extension plate and the light guide plate; and a light emitting unit, contained in the cavity and configured to be corresponsive to the light guide plate.

Wherein, wherein the extension plate has a plug section disposed at an edge of the extension plate, and the cap member has a sidewall, a groove concavely formed on the sidewall, and a snap-in slot formed on an inner wall of the groove, and the plug section is embedded into the snap-in slot, and the pad and a part of the light guide plate are embedded into the groove and covered by the cap member.

Wherein, an extension plate is extended from a side of the base plate, and a plug section is disposed at the edge of the extension plate, and a snap-in slot is formed on an inner wall of the cap member, and the plug section is embedded into the snap-in slot to facilitate a quick installation of the base plate and the cap member. In addition, the conventional base plate and cap member are manufactured by the same mold, so that the junction of the base plate and the cap member may be broken or cracked easily. On the other hand, this disclosure adopts the plug section embedded into the snap-in slot for a more secured connection. As a result, the luminous mouse pad has the advantages of providing an easy installation and a good structural strength.

DESCRIPTION OF THE PREFERRED EMBODIMENTS

Figure 1:
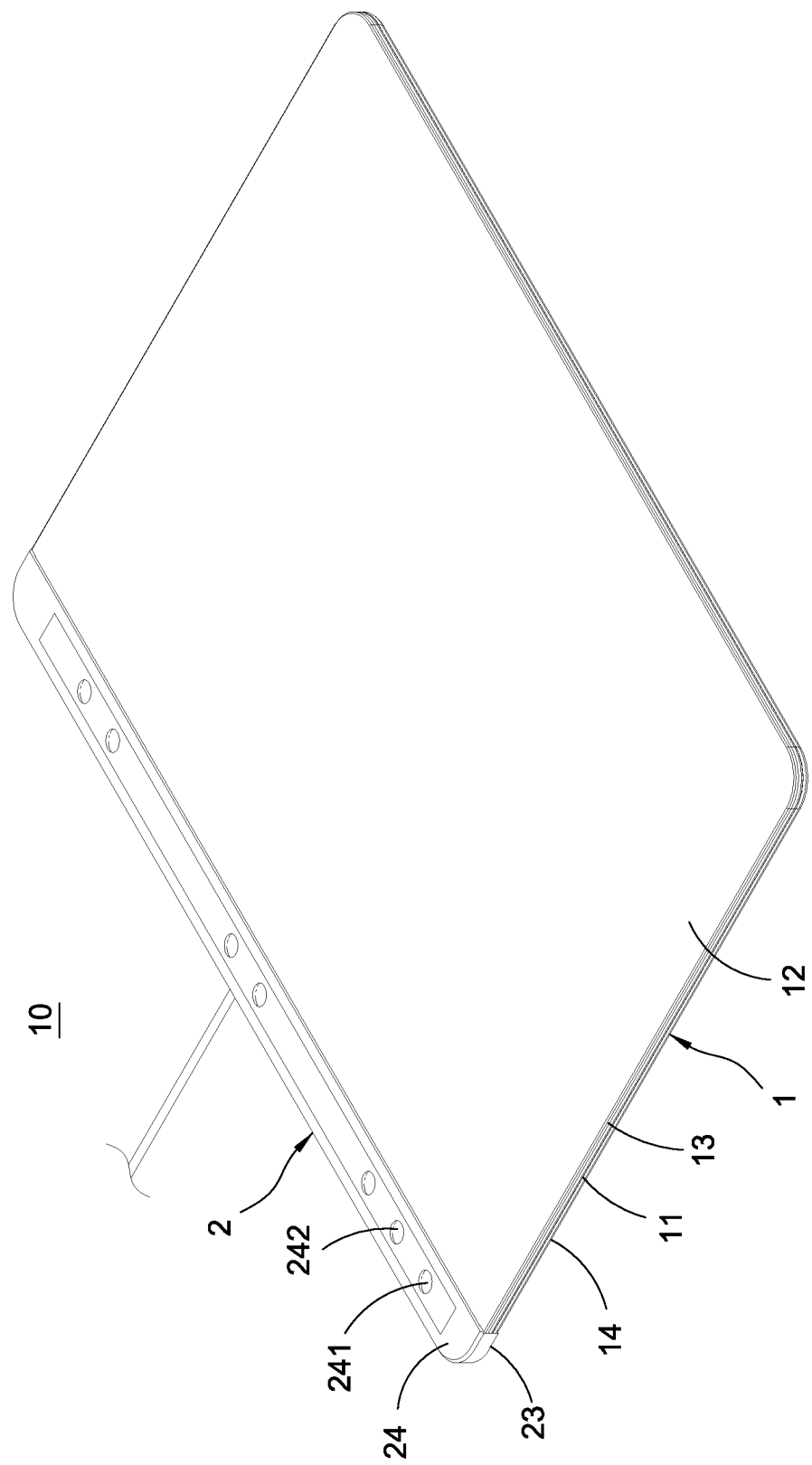
FIG. 1 is a perspective view of a luminous mouse pad of this disclosure.

The technical contents of this disclosure will become apparent with the detailed description of preferred embodiments accompanied with the illustration of related drawings as follows. It is intended that the embodiments and figures disclosed herein are to be considered illustrative rather than restrictive.

With reference to FIGS. 1 to 6 for a luminous mouse pad of this disclosure, the luminous mouse pad 10 comprises a pad assembly 1, a cap member 2 and a light emitting unit 3.

The pad assembly 1 comprises a base plate 11, a pad 12, a light guide plate 13, an anti-slip plate 14, an anti-slip layer 15, and a plurality of locking elements 16.

The base plate 11 has a main board 111, an extension plate 112 extended from a side of the main board 111, and a plug section 113 disposed at an edge of the extension plate 112.

The pad 12 may be a soft pad or a hard pad, wherein the soft pad is made of a soft material such as silica gel, rubber or stacked fabric, and the hard pad is made of a hard material such as plastic, metal or ceramic, and the pad 12 is stacked onto the top of the main board 111 and provided resting a user's hand or moving the mouse on the pad 12.

The light guide plate 13 is made of a light guide material and sandwiched between the main board 111 and the pad 12, and the light guide plate 13 guides the direction of light by the principle of total reflection.

The anti-slip plate 14 is made of an anti-slip material such as silica gel, PU or rubber and covered onto the bottom of the main board 111 to improve the friction at the bottom of the main board 111, so that when a user uses the mouse, the pad assembly 1 and a retaining surface (such as a table top) will not slide or displace with respect to each other. Wherein, the anti-slip plate 14 has an underside 141.

The anti-slip layer 15 is made of an anti-slip material such as silica gel, PU, and rubber or a viscose material such as silicone and the anti-slip layer 15 is sandwiched between the main board 111 and the light guide plate 13. Since the surface of both main board 111 and light guide plate 13 is smooth, therefore the anti-slip layer 15 arranged between the main board 111 and the light guide plate 13 can increase the friction between the main board 111 and the light guide plate 13 to prevent them from sliding or displacing with respect to each other and improve the structural strength of the pad assembly 1.

In addition, the main board 111, the pad 12, the light guide plate 13 and the anti-slip layer 15 jointly have a plurality of lock holes 17, and each locking element 16 is locked and fixed into each respective lock hole 17, so that the main board 111, pad 12, light guide plate 13 and anti-slip layer 15 can be stacked and coupled to one another securely.

In addition, the anti-slip plate 14 covers the bottom of the main board 111, and the anti-slip plate 14 also covers the plurality of locking elements 16 and the plurality of lock holes 17, so as to shelter the locking elements 16 and lock holes 17 to improve the aesthetic look of the pad assembly 1.

In FIGS. 1 to 3 and 6, the cap member 2 is assembled and coupled to the base plate 11 and totally covers the extension plate 112, and a cavity s is formed between the cap member 2, the extension plate 112, and the light guide plate 13.

Specifically, the cap member 2 has a sidewall 21, a groove 22 concavely formed on the sidewall 21, and a snap-in slot 221 formed on an inner wall of the groove 22, and the plug section 113 is embedded into the snap-in slot 21, and the pad 12 and a part of the light guide plate 13 are embedded into the groove 22 and covered by the cap member 2 to set the cavity s to a closed mode.

In addition, the cap member 2 has a bottom wall 23, an opening 231 communicated to the bottom wall 21, and the anti-slip plate 14 covers the bottom of the extension plate 112 and is accommodated in the opening 231, and the bottom wall 23 of the cap member 2 and the underside 141 of the anti-slip plate 14 are disposed on the same plane, so that the pad assembly 1 can be placed on a retaining surface (such as a table top) securely. Wherein, the cap member 2 has a top wall 24, and one or more pushbutton switches 241 and/or one or more touch switches 242 installed to the top wall 24.

In addition, both sides of the main board 111, pad 12, light guide plate 13, anti-slip plate 14 and anti-slip layer 15 jointly have two flanges sections 18 extended therefrom, and the two flanges sections 18 and the cap member 2 are blocked and positioned by each other to facilitate the assembly alignment of the pad assembly 1 and the cap member 2.

Figure 2:
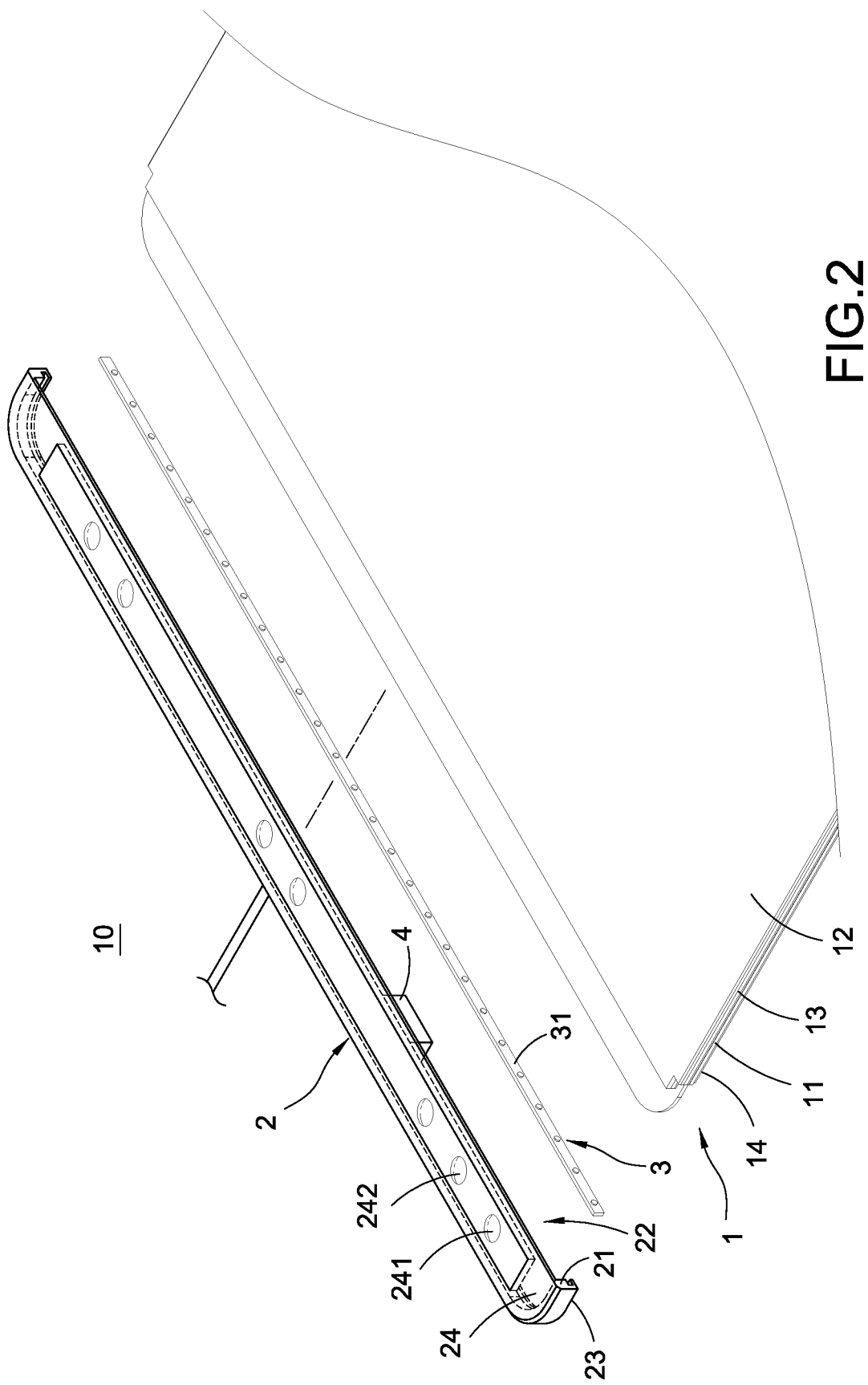
FIG. 2 is an exploded view of a luminous mouse pad of this disclosure.
Figure 3:
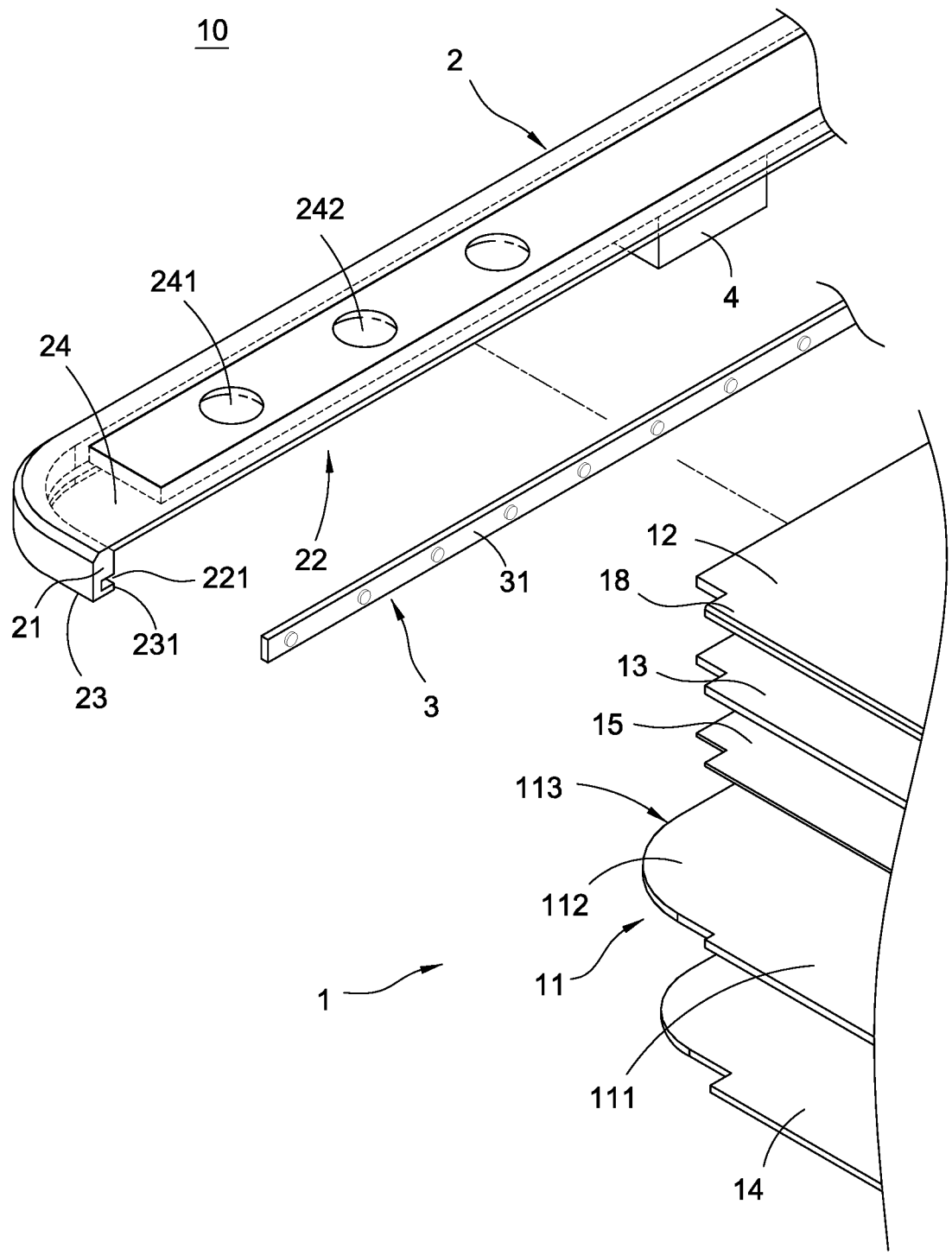
FIG. 3 is a partial exploded view of a luminous mouse pad of this disclosure.
Figure 4:
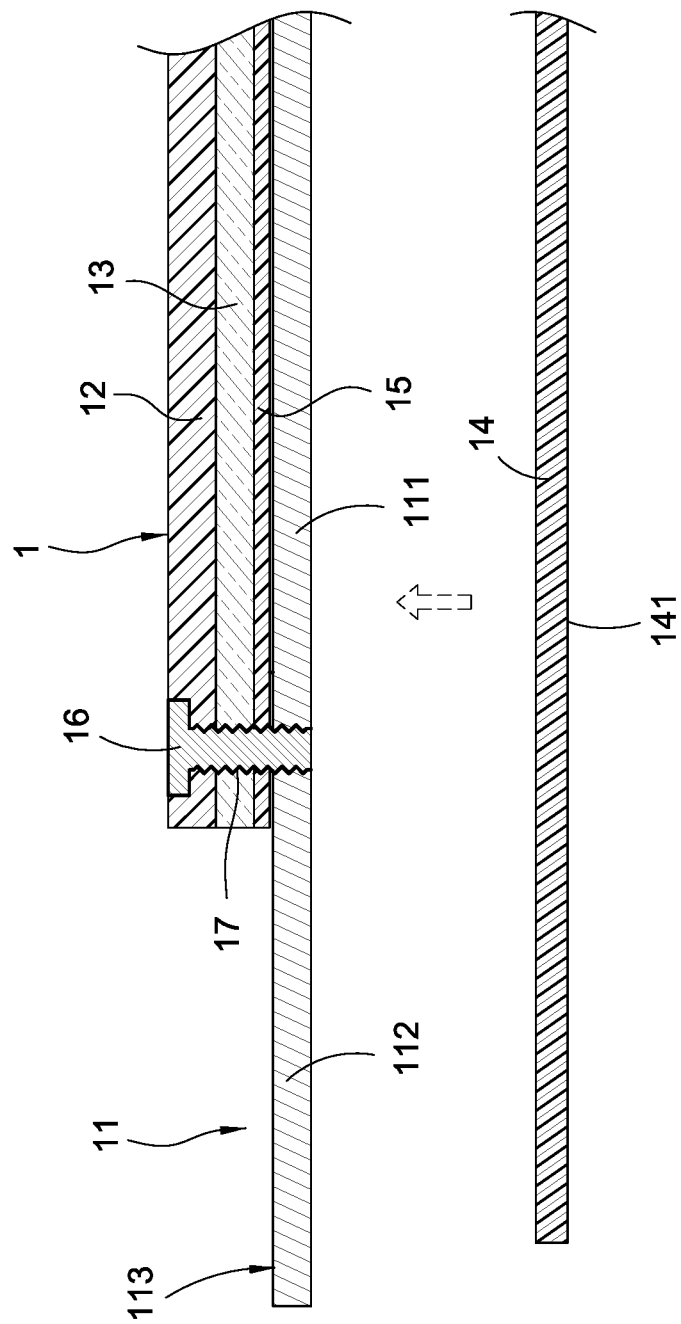
FIG. 4 is a cross-sectional view of a pad assembly of this disclosure.
Figure 5:
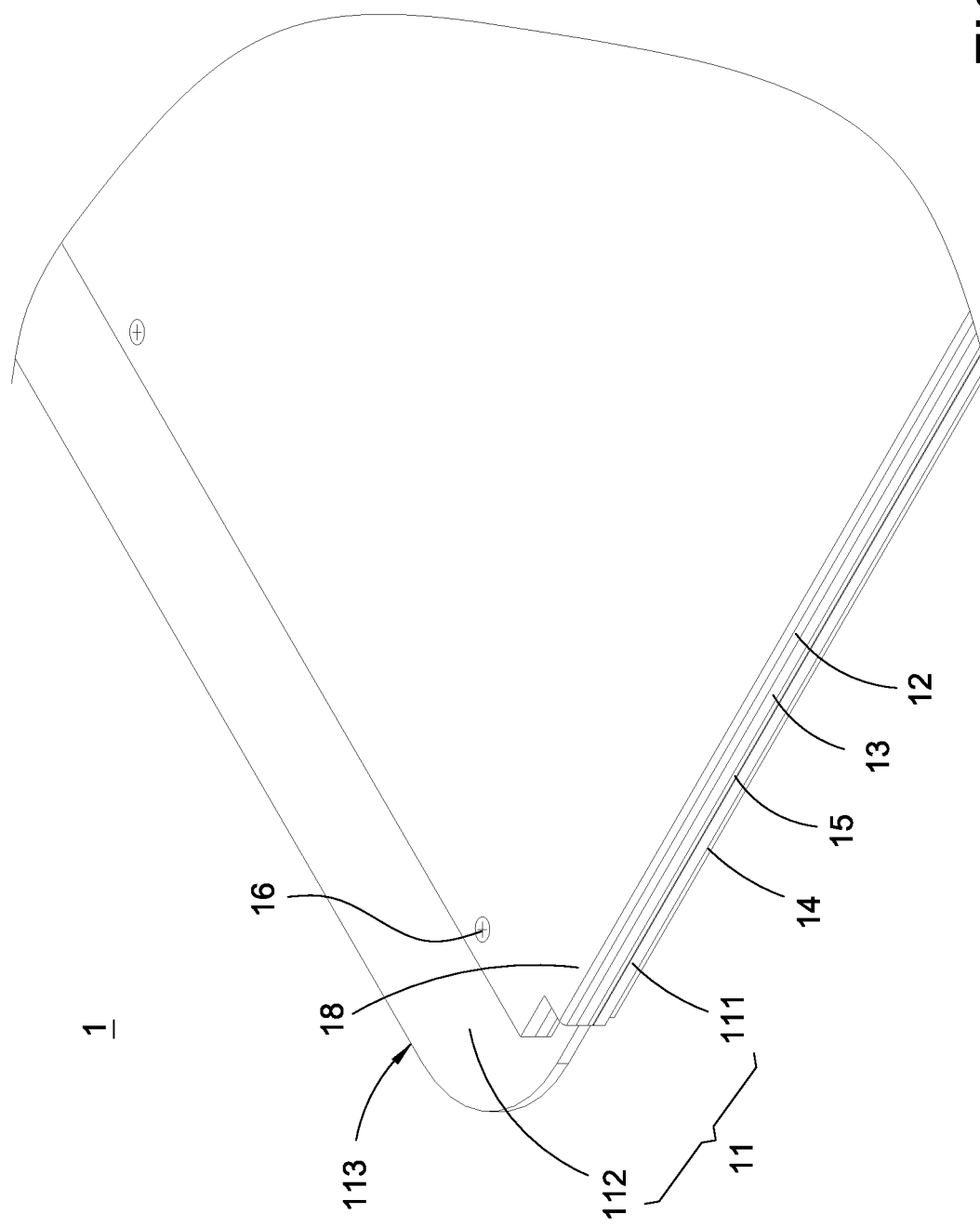
FIG. 5 is a perspective view of a pad assembly of this disclosure.
Figure 6:
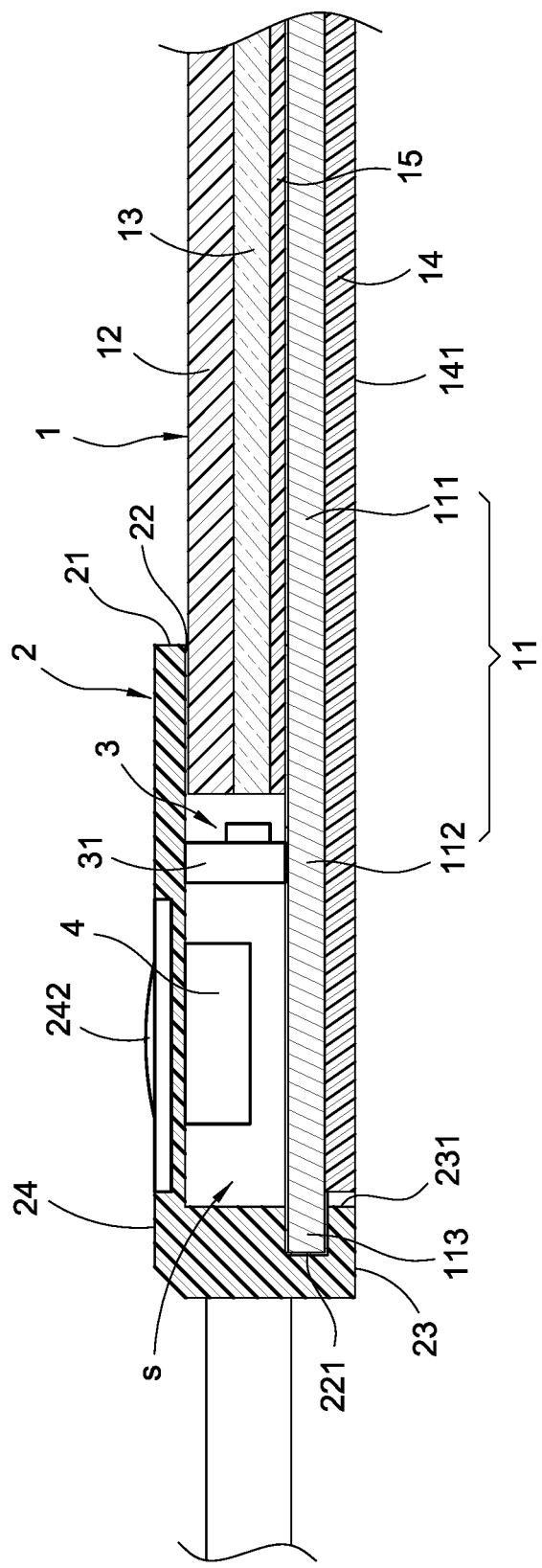
FIG. 6 is a cross-sectional view of a luminous mouse pad of this disclosure.

In FIGS. 2, 3, and 6, the light emitting unit 3 is contained in the cavity s and configured to be corresponsive to the light guide plate 13. Specifically, the light emitting unit 3 is fixed onto the extension plate 112, and the light emitting unit 3 has a light output position configured to be corresponsive to a lateral side of the light guide plate 13, and the light emitting unit 3 is an LED lamp strip 31, and the light emitting unit 3 is used for providing light to the light guide plate 13.

In FIGS. 2, 3, and 6, the luminous mouse pad 10 of this disclosure further comprises a controller 4 accommodated in the cavity s and electrically coupled to the light emitting unit 3, and each pushbutton switch 241 and each touch switch 242 are electrically coupled to the controller 4, so that when the pushbutton switch 241 or touch switch 242 is pressed, the pushbutton switch 241 or touch switch 242 can adjust the brightness, color or luminous time of the light emitting unit 3 through the controller 4.

With reference to FIGS. 1 to 3 and 6 for the using status of a luminous mouse pad 10 of this disclosure, the cap member 2 is assembled to the base plate 11 and totally covers the extension plate 112, and the cavity s is formed between the cap member 2, the extension plate 112, and the light guide plate 13, and the light emitting unit 3 is accommodated in the cavity s and configured to be corresponsive to the light guide plate 13, so that the light of the light emitting unit 3 can be guided through the light guide plate 13 to a lateral edge of the pad assembly 1, so that the lateral edge of the pad assembly 1 has a light-emitting visual perception to improve the user's visual feeling. The pad 12 and a part of the light guide plate 13 are embedded into the groove 22 and covered by the cap member 2 to set the cavity s to a closed mode, so as to prevent the light of the light emitting unit 3 from projecting onto the pad 12 or affecting the normal use of the mouse.

In addition, the base plate 11 and the cap member 2 are coupled by assembling, so that both base plate 11 and cap member 2 can be manufactured by different simple-structured molds respectively. Compared with the conventional base plate and cap member manufactured by the same complicated-structured mold, this disclosure incurs a lower cost for the simple-structure molds and provides a higher yield rate for the demolding process. Obviously, the luminous mouse pad 10 of this disclosure has the advantages of saving costs and improving the yield rate of the manufacturing process.

In addition, the base plate 11 has an extension plate 112 extended from a side of the base plate 11, a plug section 113 disposed at an edge of the extension plate 112, and a snap-in slot 221 formed on an inner wall of the cap member 2, and the plug section 113 is embedded into the snap-in slot 21 to facilitate a quick assembling of the base plate 11 and the cap member 2. Compared with the conventional base plate and cap member manufactured by the same mold and their junction that may be broken or cracked easily, this disclosure adopts the plug section 113 embedded into the snap-in slot 21 for a more secured connection, so that the luminous mouse pad 10 has the advantage of an easy assembling and a good structural strength.

While this disclosure has been described by means of specific embodiments, numerous modifications and variations could be made thereto by those skilled in the art without departing from the scope and spirit of this disclosure set forth in the claims.

What is claimed is:

1. A luminous mouse pad, comprising: a pad assembly, further comprising:
    a base plate, having a main board and an extension plate extending from a side of the main board;
    a pad, stacked onto the top of the main board;
    a light guide plate, sandwiched between the main board and the pad; and
    an anti-slip plate, covering the top of the main board;
    a cap member, coupled to the base plate and completely covering the extension plate, and a cavity being formed between the cap member, the extension plate and the light guide plate; and
    a light emitting unit, contained in the cavity and configured to be corresponsive to the light guide plate.

2. The luminous mouse pad of claim 1, wherein the extension plate has a plug section disposed at an edge of the extension plate, and the cap member has a sidewall, a groove concavely formed on the sidewall, and a snap-in slot formed on an inner wall of the groove, and the plug section is embedded into the snap-in slot, and the pad and a part of the light guide plate are embedded into the groove and covered by the cap member.

3. The luminous mouse pad of claim 2, wherein the cap member has a bottom wall, and the bottom wall has an opening communicated to the groove, and the anti-slip plate covers the bottom of the extension plate and contained in the opening, and the anti-slip plate has an underside, and the bottom wall of the cap member and the underside of the anti-slip plate are disposed on the same plane.

4. The luminous mouse pad of claim 3, wherein the pad assembly further comprises an anti-slip layer sandwiched between the main board and the light guide plate.

5. The luminous mouse pad of claim 4, wherein the pad assembly further comprises a plurality of locking elements, and the main board, the pad, the light guide plate and the anti-slip layer jointly have a plurality of lock holes, and each of the locking elements is locked and fixed to each respective lock hole, and the anti-slip plate covers the plurality of locking elements and the plurality of lock holes.

6. The luminous mouse pad of claim 5, wherein both sides of the main board, the pad, the light guide plate, the anti-slip plate and the anti-slip layer jointly have two flange sections extended therefrom, and the two flange sections and the cap member are blocked and positioned by each other.

7. The luminous mouse pad of claim 6, further comprising a controller accommodated in the cavity and electrically coupled to the light emitting unit.

8. The luminous mouse pad of claim 7, wherein the cap member has a top wall, and at least one pushbutton switch installed on the top wall and electrically coupled to the controller.

9. The luminous mouse pad of claim 7, wherein the cap member has a top wall, and at least one touch switch installed on the top wall and electrically coupled to the controller.

10. The luminous mouse pad of claim 1, wherein the light emitting unit is an LED lamp strip, and the light emitting unit is fixed onto the extension plate, and the light emitting unit has a light output position configured to be corresponsive to a lateral edge of the light guide plate.

* * * * *